United States Patent [19]
Dornhoefer et al.

[11] Patent Number: 6,008,557
[45] Date of Patent: Dec. 28, 1999

[54] BEARING ASSEMBLY HAVING A SLINGER DISK SEAL ELEMENT

[75] Inventors: Gerd Dornhoefer, Leonberg; Hartmut Nitzsche, Buehl; Bernd Wieland, Gaggenau, all of Germany

[73] Assignee: Robert Bosch GmbH, Stuttgart, Germany

[21] Appl. No.: 09/068,872

[22] PCT Filed: Aug. 28, 1997

[86] PCT No.: PCT/DE97/01866

§ 371 Date: Jul. 16, 1998

§ 102(e) Date: Jul. 16, 1998

[87] PCT Pub. No.: WO98/13610

PCT Pub. Date: Apr. 2, 1998

[30] Foreign Application Priority Data

Sep. 24, 1996 [DE] Germany .......................... 196 39 082
Jun. 19, 1997 [DE] Germany .......................... 197 25 970

[51] Int. Cl.⁶ .................................................. H02K 5/16
[52] U.S. Cl. .............................................. 310/90; 384/135
[58] Field of Search .............................. 310/90; 384/135, 384/136, 138, 464

[56] References Cited

U.S. PATENT DOCUMENTS

Re. 35,855   7/1998  Blaettner et al. ...................... 384/204
3,573,510    4/1971  Otto ........................................ 308/132
3,793,543    2/1974  Stokke et al. ............................ 310/90
3,885,176    5/1975  Cunningham ............................ 310/88
4,711,590   12/1987  Lakin ...................................... 384/206
4,781,476   11/1988  Uhen ...................................... 384/136
4,820,948    4/1989  Rogelein .................................. 310/90
5,798,589    9/1998  Ohi et al. ................................. 310/90

FOREIGN PATENT DOCUMENTS 698 956    2/1996   European Pat. Off. .
88 09 000  11/1988  Germany .

*Primary Examiner*—Clayton LaBalle
*Assistant Examiner*—Kurl Tamai
*Attorney, Agent, or Firm*—Kenyon & Kenyon

[57] ABSTRACT

A bearing for a driving shaft of an electrical machine is lubricated by a lubricant. Located between the bearing and rotating parts arranged on the driving shaft is a seal element for lubricant emerging from the bearing. The seal element is configured in the form of a slinger disk by which lubricant emerging from the bearing is returned to the bearing, thus resulting in a closed lubricant circulation. The slinger disk is produced entirely from an elastic material. Lubricant sent off from the slinger disk is returned directly to the bearing.

6 Claims, 2 Drawing Sheets

BEARING ASSEMBLY HAVING A SLINGER DISK SEAL ELEMENT

BACKGROUND INFORMATION

The present invention relates to a bearing for use with an electrical machine that includes a drive shaft mounted in a housing.

European Published Patent Application No. 698 956 describes a known bearing in which a spherical cap, which is made of sintered material and with which a repository for lubricant is associated in order to lubricate the bearing, is used to mount a driving shaft of an electrical machine. Located between the spherical cap and the commutator is a thrust washer or cover disk which consists of a first solid annular disk element and a second elastic disk element joined positively thereto. The solid disk element has two peripheral slinger edges facing the spherical cap. The sintered material used for the spherical cap has the property that because of the capillary effect of the interstices which are present, lubricant is stored and is delivered to the drive shaft during operation as a result of pressure differences. This results in lubrication of the driving shaft, so that it is mounted in a low-friction and low-wear manner in the spherical cap. Due to heating of the sintered bearing during operation of the electrical machine, however, an increase in the volume of the stored lubricant can occur, so that it can emerge laterally out of the sintered bearing. This lubricant emerging during operation is thrown onto the bearing housing via the slinger edges, and returns from there to the spherical cap. This arrangement allows reliable sealing of the bearing even with large assembly tolerances. The two-part configuration of the slinger disk nevertheless requires increased manufacturing and assembly outlay. Moreover, without additional sealing measures it is impossible to rule out completely the possibility that lubricant slung onto the housing wall may penetrate via the surrounding housing to the adjacent commutator.

U.S. Pat. No. 4,711,590 discloses a bearing device for mounting the driving shaft of an electrical machine, having a one-piece slinger disk made of a solid material. The bearing arrangement as a whole is separated by means of a housing from rotating parts arranged on the driving shaft.

SUMMARY OF THE INVENTION

An object of the present invention is to provide a bearing arrangement which is simple to manufacture and which reliably prevents lubricant from getting onto the rotating parts arranged on the driving shaft.

In order to achieve this object, the slinger disk of the present invention is made in one piece of an elastic material and can be manufactured economically and easily even with complex geometries. The flexibility of the slinger disk of the present invention facilitates the assembly thereof, so that the bearing as a whole is easy to assemble. Advantageously, a thermoplastic elastomer is used to manufacture the slinger disk.

It is particularly advantageous if the bearing is configured, toward the slinger disk, in such a way that any lubricant slung away by the slinger disk is thrown directly back onto the bearing.

DETAILED DESCRIPTION

Figure 1:
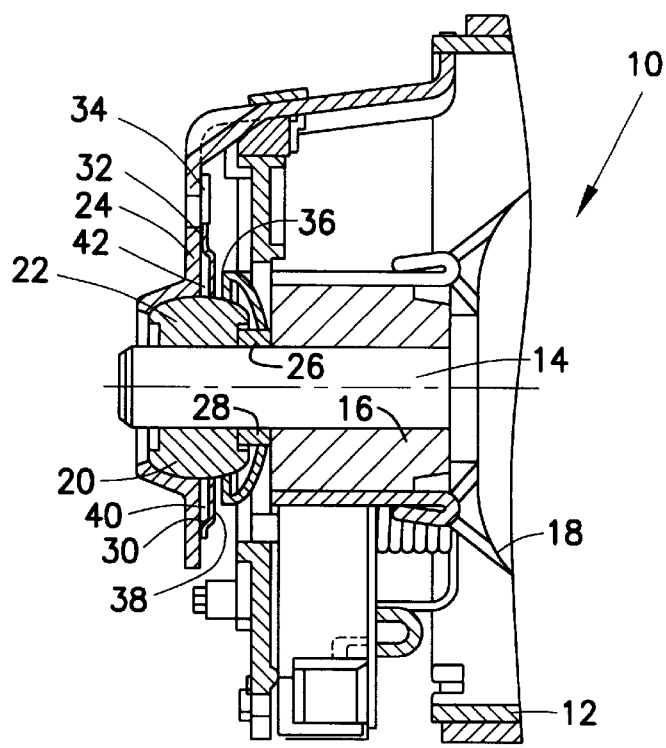
FIG. 1 shows a sectioned depiction through the bearing region of a continuous excited direct-current motor.

FIG. 1 shows, in a sectioned depiction, the commutator-side bearing region of a continuously excited direct-current motor 10. Direct-current motor 10 possesses a driving shaft 14, mounted within a housing 12, which carries a commutator 16 and a rotor 18. Driving shaft 14 is mounted in a sintered bearing 20. Sintered bearing 20 is arranged in a recess 22 of a bearing shell 24. Bearing shell 24 is immovably joined to housing 12. Additional details of direct-current motor 10 will not be discussed further in the context of the present description, since the construction and operation of a direct-current motor are commonly known. Only the parts essential for the invention will therefore be explained in more detail below.

A seal element 26 is arranged immovably between sintered bearing 20 and commutator 16 on driving shaft 14 so that seal element 26 co-rotates as driving shaft 14 rotates. Seal element 26 is constituted by a slinger disk 28. Slinger disk 28 consists entirely of an elastic material, preferably of a thermoplastic elastomer. Sintered bearing 20 is arranged immovably in recess 22 and is retained by a clamp 30. Clamp 30 constitutes an attachment flange 32 which is attached by means of an attachment means 34 to bearing shell 24. Clamp 30 furthermore constitutes a receptacle 36 which rests against sintered bearing 20 and immobilizes the latter in recess 22 of bearing shell 24. A section 38 of clamp 30 joining attachment flange 32 to receptacle 36 is configured so that there results between section 38 and bearing shell 24 a cavity 40 which is filled with a lubricant 42 in the form of oil in an inorganic or organic thickener. Lubricant 42 serves as a source for lubricant stored in known fashion in sintered bearing 20. Because of the porosity of the sintered material of sintered bearing 20, a lubricant can be stockpiled there by impregnation, and is stored in sintered bearing 20 as a result of a capillary effect.

The specific design of sintered bearing 20 and seal element 26 that is in accordance with the present invention will be explained in more detail with reference to the following FIGS. 2 through 5.

Figure 2:
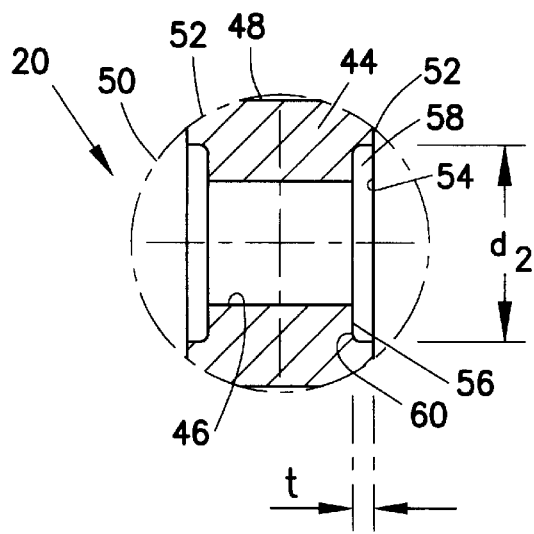
FIG. 2 shows a sectioned depiction through a bearing.

As is evident from FIG. 2, sintered bearing 20 possesses a base element 44 which is configured substantially cylindrically. Base element 44 possesses a through opening 46 which serves to receive driving shaft 14. In this context, a diameter of through opening 46 corresponds substantially to a diameter of driving shaft 14, so that the latter can be mounted with a bearing clearance corresponding to the operating conditions, for example temperature range, and the lubricant being used. External periphery 48 of base element 44 possesses flattened areas 52, extending along an imaginary circular line 50, whose contour corresponding to circular line 50 is matched on the one hand to recess 22 of bearing shell 24 and to receptacle 36 of clamp 30. Base element 44 possesses, at least on its side facing commutator 16, an axial depression 54 with a diameter d which is greater than a diameter of through opening 46 but less than the diameter of base element 44 in the region of flattened areas 52. As a result of depression 54, through opening 46 is more or less divided, in the region of depression 54, into a smaller-diameter section and a larger-diameter section, transitioning via an annular step 56. In this context, driving shaft 14 is mounted exclusively in the smaller-diameter region of through opening 46. The presence of depression 54 thus results in the constitution of a space 58 which is delimited by annular step 56, driving shaft 14, a peripheral surface 60, depression 54, and seal element 26. A transition from annular step 56 into peripheral surface 60 is accomplished preferably via a radius.

Figure 3:
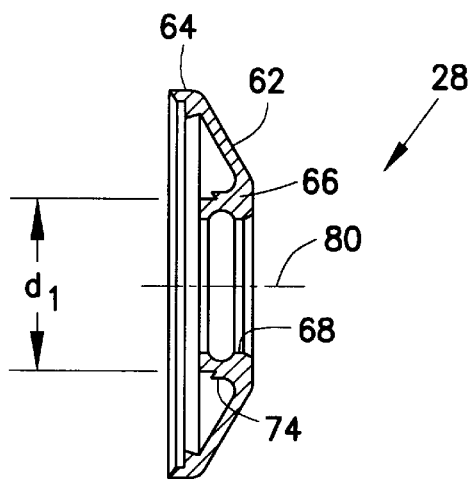
FIG. 3 shows a sectioned depiction through a seal element.
Figure 4:
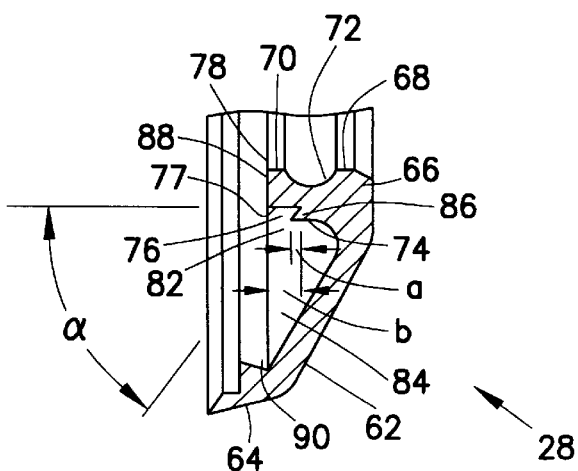
FIG. 4 shows an enlarged detail view of the seal element of FIG. 3.

Slinger disk 28 is depicted in more detail in FIGS. 3 and 4, FIG. 3 showing a sectioned depiction and FIG. 4 an enlarged partial view of the sectioned depiction. Slinger disk 28 consists of a concavely curved disk 62 whose concavity faces in the direction of sintered bearing 20. Disk 62 consists entirely of an elastic material which is selected so as to damp impact noises generated by sintered bearing 20 striking against slinger 28 when driving shaft 14 is axially excited. Slinger disk 28 lies against driving shaft 14 with an elastic press fit, thus additionally preventing oil from migrating along driving shaft 14. Disk 62 has an external ridge 64 and an internal ridge 66. Internal ridge 66 surrounds a through opening 68 whose diameter corresponds to the diameter of driving shaft 14. A peripheral surface 70 of through opening 68 possesses an annular groove 72 which constitutes a sealing fit with driving shaft 14. Internal ridge 66 possesses, on its outer peripheral surface 74, a further annular groove 76 which is constituted by a radial surface 77 of an axially reentrant edge 78 and an edge 82 projecting outward at an angle α to an axis 80. The axial dimension c of edge reentrant 78 is selected to be greater than the axial dimension b of edge 82, thus resulting in a lug-shaped projection 86 which runs annularly and extends into cavity 84 encompassed by periphery 62 of slinger disk 28. A diameter $d_1$ of peripheral surface 74 is smaller than diameter $d_2$ of depression 54 of sintered bearing 20.

Figure 5:
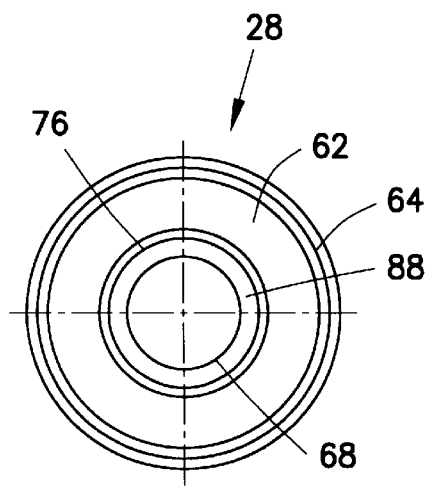
FIG. 5 shows a plan view of the seal element.

It is clear from the plan view of slinger disk 28 shown in FIG. 5 that annular groove 76 completely surrounds through opening 68. In this context, reentrant edge 78 of annular groove 76 is arranged at a distance from through opening 68, thus resulting in a radially extending annular surface 88. Because of the configuration of edges 78 and 82, annular surface 88 extends at an axial distance c from projection 86. Distance c is selected to be less than a depth t of depression 54 of sintered bearing 20 (FIG. 2).

During the assembly of direct-current motor 10, slinger disk 28 is slid, with a corresponding undersize with respect to driving shaft 14, onto driving shaft 14 until it rests against commutator 16. Annular surface 88 of slinger disk 28 rests against annular step 56 of sintered bearing 20. The result is that annular groove 76 extends within space 58, such that projection 86 ends in space 58 and is at a distance a from annular step 56.

While direct-current motor 10, which for example can serve as the drive motor of a cooling and climate-control fan, is being used as intended, driving shaft 14 and rotor 18, commutator 16, and slinger disk 28 attached thereon rotate in accordance with the rotation speed of driving shaft 14. Driving shaft 14 simultaneously rotates within sintered bearing 20; because of lubricant 42 stored in sintered bearing 20, a lubricant film is produced between sintered bearing 20 and driving shaft 14, resulting in low-friction mounting of driving shaft 14. During the operation of direct-current motor 10, heating of sintered bearing 20 may occur as a result of internal or external influences that will not be discussed here in further detail. As a result, the stored lubricant 42 experiences an increase in volume that can be, for example, 10 to 15%. Because of this increase in volume, the lubricant 42 emerges, among other directions, axially from sintered bearing 20 and encounters slinger disk 28. Because slinger disk 28 rests in sealed fashion against driving shaft 14, the sealing effect being enhanced by annular groove 72 in peripheral surface 70 resting on driving shaft 14, the emerging lubricant 42 cannot move past slinger disk 28 in the direction of commutator 16. The emerging lubricant 42 passes through the contact seat created by annular step 56 of sintered bearing 20 and annular surface 88 of slinger disk 28, and migrates toward space 58. There it migrates along axially reentrant edge 78 into annular groove 76. The emerging lubricant 42 is retained in annular groove 76 as a result of the capillary effect. As the amount of lubricant 42 emerging axially from sintered bearing 20 steadily increases, edge 82 projecting outward at an angle constitutes a flow barrier, so that annular groove 76 becomes increasingly filled with lubricant 42 up to a maximum. When the receiving capacity of annular groove 76 is exceeded, lubricant 42 is slung off via projection 86 as a result of the centrifugal forces occurring due to the rotation of slinger disk 28. Depending on the selection of angle, which is preferably 45°, lubricant 42 is slung off into space 58. Since distance c is less than depth t, within space 58 lubricant 42 encounters annular step 56 or peripheral surface 60 of depression 54. As a result of the capillary effect of the sintered material of sintered bearing 20, the lubricant 42 striking base element 44 of sintered bearing 20 can be taken up again by sintered bearing 20 and reused to lubricate sintered bearing 20. The overall result is thus a closed lubricant circulation which prevents lubricant 42 from emerging beyond sintered bearing 20 or cavity 84 enclosed by disk 62. This on the one hand prevents any contamination of the interior of housing 12 of direct-current motor 10, and the lubricant supply of sintered bearing 20 is always being topped up, so that overall, maintenance-free operation is possible. Any impairment of the electrical functionality of direct-current motor 10 due to the formation of a carbonized lubricant paste on commutator 16 is also prevented.

As a feature which is not absolutely necessary for the closed lubricant circulation according to the present invention, FIG. 4 shows the elastic slinger disk 28 as possessing on its external ridge 64 a further annular groove 90, open radially toward driving shaft 14, which serves as a safety collector for any lubricant 42 that might still, due to extreme operating situations, manage to get out of space 58. In such a case lubricant 42 is reliably prevented from entering the interior of direct-current motor 10.

The present invention is of course not limited to the exemplary embodiment depicted. For example, the combination according to the invention of sintered bearing 20 with the present elastic slinger disk 28 may also be utilized in any other bearing to achieve the closed lubricant circulation. In particular, any other bearing lubricated 42 with lubricant may also be provided instead of a sintered bearing 20 which stores lubricant. The applications of the bearing are also not limited to electrical machines.

What is claimed is:

1. A bearing assembly for guiding a driving shaft of an electrical machine having rotating parts arranged on the driving shaft, comprising:
  a bearing lubricated by a lubricant; and
  a lubricant seal element arranged between the bearing and the rotating parts and being formed as a slinger disk made of an elastic materials, wherein:
    the slinger disk and the bearing form a closed lubricant circulation through which the lubricant emerging from the bearing is returned to the bearing,
    the lubricant emerging from the bearing is returned directly to the bearing via the slinger disk, the slinger disk has an annular groove in which the lubricant is collected, the annular groove is formed by a radial surface of an axially reentrant edge of the slinger disk and a second edge of the slinger disk that projects outward at a predetermined angle from said radial surface of said axially reentrant edge, said axially reentrant edge has an axial dimension that is greater in length than an axial dimension of the second edge, and the second edge forms an annular projection which ends at a predetermined distance from a radial annular surface of the slinger disk from which the axially reentrant edge is formed.

2. The bearing assembly according to claim 1, wherein the bearing includes an axial depression arranged on a side of the bearing facing the lubricant seal element and into which the lubricant seal element at least partly engages.

3. The bearing assembly according to claim 2, wherein a diameter of the axial depression is greater than a diameter of the annular projection.

4. The bearing assembly according to claim 2, wherein a depth of the axial depression is greater than the predetermined distance, and wherein the annular groove and the annular projection are arranged inside the axial depression.

5. A bearing assembly for guiding a driving shaft of an electrical machine having rotating parts arranged on the driving shaft, comprising:

a bearing lubricated by a lubricant; and a lubricant seal element arranged between the bearing and the rotating parts and being formed as a slinger disk by which the lubricant emerging from the bearing is retained, the slinger disk being made of an elastic material and having an annular groove in which the lubricant is collected, wherein:

the annular groove includes an annular projection located at a distance from a radial annular surface of the slinger disk, a side of the bearing facing the slinger disk includes an axial recess having a depth, and the depth of the axial recess is greater than the distance of the annular projection from the radial annular surface such that the annular projection is located inside the axial recess.

6. The bearing assembly according to claim 5, wherein the annular groove is formed by an axially reentrant edge of the slinger disk and a second edge of the slinger disk that projects outward at a predetermined angle from a surface of the axially reentrant edge.

* * * * *